(12) United States Patent
Landry

(10) Patent No.: US 9,231,402 B2
(45) Date of Patent: Jan. 5, 2016

(54) CIRCUIT DEVICE AND METHOD OF SUPPRESSING A POWER EVENT

(75) Inventor: D. Matthew Landry, Austin, TX (US)

(73) Assignee: Silicon Laboratories Inc., Austin, TX (US)

(*) Notice: Subject to any disclaimer, the term of this patent is extended or adjusted under 35 U.S.C. 154(b) by 1824 days.

(21) Appl. No.: 11/964,368

(22) Filed: Dec. 26, 2007

(65) Prior Publication Data

US 2009/0168278 A1 Jul. 2, 2009

(51) Int. Cl.
*H02H 3/20* (2006.01)
*H02H 9/04* (2006.01)
*H02H 7/125* (2006.01)

(52) U.S. Cl.
CPC ............ *H02H 9/041* (2013.01); *H02H 7/1252* (2013.01)

(58) Field of Classification Search
CPC .............................. H02H 9/041; H02H 7/1252
USPC ................. 363/71, 81, 84, 89, 125, 126, 127; 361/91.1, 111
See application file for complete search history.

(56) References Cited

U.S. PATENT DOCUMENTS

| | | | |
|---|---|---|---|
| 5,689,133 A * | 11/1997 | Li et al. | 257/361 |
| 5,847,912 A | 12/1998 | Smith et al. | 361/93 |
| 6,181,588 B1 * | 1/2001 | Kates et al. | 363/126 |
| 6,212,084 B1 | 4/2001 | Turner | 363/127 |
| 7,199,636 B2 | 4/2007 | Oswald et al. | 327/325 |
| 7,269,038 B2 * | 9/2007 | Shekhawat et al. | 363/71 |
| 7,373,532 B2 * | 5/2008 | Schindler | 713/300 |
| 2007/0170903 A1 | 7/2007 | Apfel | 323/282 |
| 2007/0171690 A1 | 7/2007 | Apfel | 363/127 |

* cited by examiner

*Primary Examiner* — Thienvu Tran
*Assistant Examiner* — Tien Mai
(74) *Attorney, Agent, or Firm* — Cesari & Reed LLP; R. Michael Reed

(57) ABSTRACT

A circuit device includes a diode bridge having a first power input and a second power input and having a first output terminal and a second output terminal. The diode bridge includes a plurality of diodes and a respective plurality of diode bypass elements associated with the plurality of diodes. The circuit device further includes a logic circuit to detect a power event at the first and second power inputs and to selectively activate one or more of the respective plurality of diode bypass elements in response to detecting the power event to limit a rectified power supply at the first and second output terminals.

26 Claims, 10 Drawing Sheets

CIRCUIT DEVICE AND METHOD OF SUPPRESSING A POWER EVENT

FIELD OF THE DISCLOSURE

The present disclosure is generally related to a circuit device and method of suppressing a power event.

BACKGROUND

Power over Ethernet (PoE), which is outlined in IEEE Std 802.3™-2005 clause 33 (the PoE standard), refers to a technique for delivering power and data to an electronic device via Ethernet cabling. In a PoE system, a power sourcing equipment (PSE) device provides a power supply to electronic devices, which may be referred to as powered devices, via an Ethernet cable. PoE eliminates the need for a separate power source to deliver power to attached powered devices. Such powered devices may include voice over Internet protocol (VoIP) telephones, wireless routers, security devices, field devices to monitor process control parameters, data processors, other electronic devices, or any combination thereof.

In general, the PoE standard requires each of the Ethernet ports associated with a powered device (i.e., an electronic device that receives both power and data from the Ethernet cable) to be adapted to suppress transient power surges in excess of 1000 mA for short durations. Such transient power events may be induced via electrostatic discharges to the Ethernet cabling, for example, during attachment and detachment of Ethernet enabled devices. Conventionally, such surge suppression includes an external zener diode having a breakdown voltage of approximately 64 volts, which, in response to receiving an input voltage in excess of 64 volts, breaks down to conduct current power between a positive supply terminal and a negative supply terminal. Typically, an external zener diode is used instead of an integrated zener diode to dissipate heat, so that when the zener diode breaks down and conducts current, the heat dissipated by the zener diode does not damage other circuitry. However, such external zener diodes are expensive relative to integrated zener diodes.

SUMMARY

In a particular embodiment, a circuit device includes a diode bridge having a first power input and a second power input and having a first output terminal and a second output terminal. The diode bridge includes a plurality of diodes and a respective plurality of diode bypass elements associated with the plurality of diodes. The circuit device also includes a logic circuit to detect a power event at the first and second power inputs and to selectively activate one or more of the respective plurality of diode bypass elements in response to detecting the power event to limit a rectified power supply at the first and second output terminals.

In another particular embodiment, a circuit device includes an interface responsive to a power over Ethernet network. The interface includes a first input terminal and a second input terminal. The circuit device also includes a rectifier circuit coupled to the first and second input terminals to receive a power input and to provide a positive power supply to a first power terminal and a negative power supply to a second power terminal. The rectifier circuit includes a first metal oxide semiconductor field effect transistor (MOSFET) device having a first body diode, which includes a first anode terminal coupled to the second power terminal and a first cathode terminal coupled to the first input terminal. The rectifier circuit also includes a second MOSFET device having a second body diode, which includes a second anode terminal coupled to the first input terminal and a second cathode terminal coupled to the first power terminal. The rectifier circuit further includes a third MOSFET device having a third body diode, which includes a third anode terminal coupled to the second input terminal and a third cathode terminal coupled to the first power terminal. The rectifier circuit also includes a fourth MOSFET device having a fourth body diode, which includes a fourth anode terminal coupled to the second power terminal and a fourth cathode terminal coupled to the second input terminal. The circuit device further includes a logic circuit coupled to the first, second, third, and fourth MOSFET devices. The logic circuit detects a power event at the first and second inputs and selectively activates at least one of the first, second, third, and fourth MOSFET devices in response to detecting the power event to suppress the power event to a power level that is at or below a threshold power level.

In still another particular embodiment, a method is disclosed that includes receiving an input signal at a first input and at a second input to a rectifier circuit. The rectifier circuit includes body diodes of a plurality metal oxide semiconductor field effect transistor (MOSFET) devices. The method further includes rectifying the input signal via the body diodes to produce a rectified output signal at a first output terminal and at a second output terminal, which first and second output terminals are coupled to low power circuitry. The method also includes detecting a power event based on a power level associated with the input signal and selectively activating at least one of the plurality of MOSFET devices to limit the rectified output signal to protect the low power circuitry when the power level exceeds a threshold power level.

In yet another particular embodiment, a circuit device includes a diode bridge comprising a plurality of diodes. The diode bridge includes a first diode bypass element associated with a first diode of the plurality of diodes and includes a second diode bypass element associated with a second diode of the plurality of diodes. The diode bridge also includes a first input terminal, a second input terminal, a first output terminal, and a second output terminal. The circuit device further includes a logic circuit adapted to determine a first electrical parameter associated with the diode bridge and a second electrical parameter associated with the first and second input terminals. The logic circuit selectively activates the first diode bypass element in response to determining the first electrical parameter and selectively activates the second diode bypass element in response to determining the second electrical parameter.

One particular advantage provided by embodiments of the circuit device and method of suppressing a power event is that the diode bridge includes integrated suppression circuitry to provide an early transient surge protection.

Another particular advantage is that the surge protection circuitry is less expensive than a conventional external zener diode surge protection circuit.

Still another particular advantage is that, since the diode bridge circuit includes body diodes of a plurality of metal oxide semiconductor field effect transistor (MOSFET) devices, power consumption due to diode drops in the diode bridge may be reduced by activating selected MOSFET devices to bypass the diodes when the device is in an active mode. Further, the plurality of MOSFET devices may be used to suppress a transient surge event by activating selected MOSFET devices to shunt an input current and/or to clamp an input voltage between input power supply terminals.

Another advantage is that the integration of the diode bypass circuitry and the control circuitry allows the diode bridge to function as a surge suppressor, which reduces overall circuit costs by eliminating an extra (external) zener diode. Further, by shunting excess current through transistor devices, less heat is generated than with a traditional external zener diode.

Yet another advantage is that incorporating the surge suppression circuitry into the diode bridge allows power events to be suppressed without adding additional circuitry to account for a polarity associated with the transient power event.

Other aspects, advantages, and features of the present disclosure will become apparent after review of the entire application, including the following sections: Brief Description of the Drawings, Detailed Description, and the Claims.

DETAILED DESCRIPTION

Figure 1:
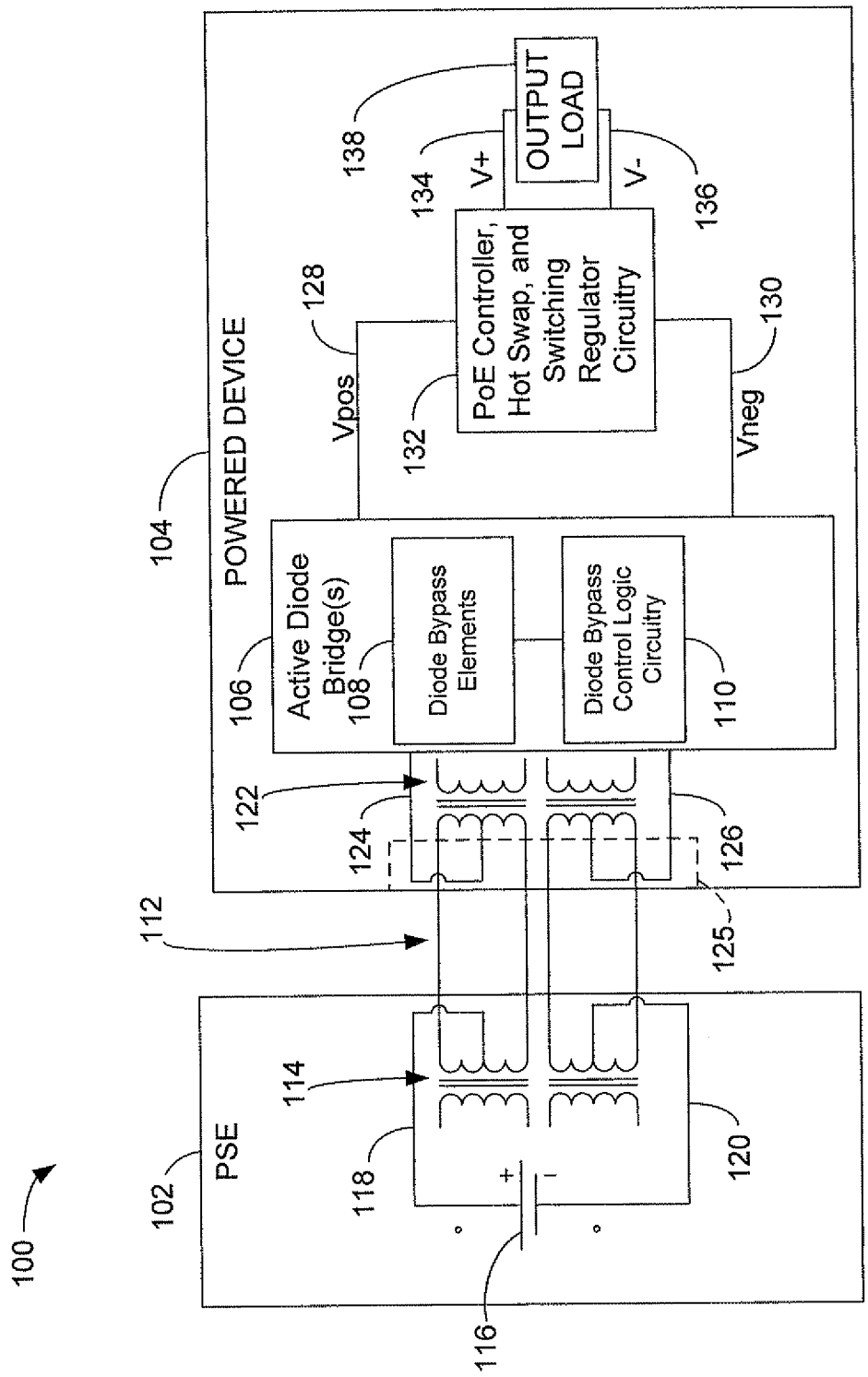
FIG. 1 is a block diagram of an embodiment of a Power over Ethernet (PoE) system including power sourcing equipment and a powered device having active diode bridges with integrated surge protection.

FIG. 1 is a block diagram of an embodiment of a Power over Ethernet (PoE) system 100. The PoE system 100 includes power sourcing equipment (PSE) 102 coupled via an Ethernet cable 112 to a powered device 104 having an active diode bridge 106. The active diode bridge 106 includes one or more diode bypass elements 108 and includes diode bypass control logic circuitry 110. In a PoE system, the Ethernet cable 112 may carry power via a first wire pair or a second wire pair. In a particular embodiment, the powered device 104 includes one or more active diode bridges having respective diode bypass elements to rectify a power supply from either the first or second wire pair. In another particular embodiment, the diode bypass control logic circuitry 110 may be shared by one or more diode bridges to control respective diode bypass elements.

The PSE 102 includes a transformer 114 that is coupled to a power source 116 via wires 118 and 120, which are coupled to wires of an Ethernet cable 112. The powered device 104 includes an interface 125, such as an Ethernet connector (i.e., an RJ-45 Ethernet connector), that couples the Ethernet cable 112 to a transformer 122. The transformer 122 is coupled to the active diode bridge 106 via first and second input terminals 124 and 126. The active diode bridge 106 receives a signal via the first and second input terminals 124 and 126 and rectifies the signal to provide a positive power supply (Vpos) to a first terminal 128 and to provide a negative power supply (Vneg) to a second terminal 130. The powered device 104 also includes Power over Ethernet (PoE) controller, hot swap, and switching regulator circuitry 132 that is coupled to the first and second terminals 128 and 130 to receive a power supply and to provide a regulated power supply to a first supply terminal 134 and to a second supply terminal 136, which are coupled to an output load 138. In a particular embodiment, the output load 138 may include one or more circuits.

In a particular illustrative embodiment, the diode bypass control logic circuitry 110 is adapted to determine a voltage differential between the first and second terminals 128 and 130 to detect a power event, such as a transient power surge event. When the voltage differential is less than or equal to a voltage threshold, the diode bypass control logic circuitry 110 is adapted to selectively activate one or more of the diode bypass elements 108. Activation of the one or more diode bypass elements 108 reduces power consumption due to diode voltage drops within the active diode bridge. When the voltage differential exceeds the voltage threshold, the diode bypass control logic circuitry 110 is adapted to selectively activate at least one of the diode bypass elements 108 to establish a current path through the diode bridge 106 between the first and second input terminals 124 and 126.

In a particular embodiment, the diode bypass control logic circuitry 110 is adapted to selectively activate at least one of the diode bypass elements 108 to clamp an input voltage at the first and second input terminals 124 and 126 to a voltage level that is at or below the threshold voltage. In another particular embodiment, the input voltage at the first and second terminals 124 and 126 is clamped at a voltage level that is approximately equal to the threshold voltage. For example, the voltage level may be at a level that is approximately equal to a breakdown voltage of a zener diode plus one or more diode voltage drops. By clamping the input voltage and by shunting current between the first and second input terminals 124 and 126, the diode bypass control logic circuitry 110 protects low power circuitry, such as the PoE controller, hot swap, and switching regulator circuitry 132 and the output load 138, from power surge events. In a particular embodiment, the low power circuitry includes circuit devices that have power ratings of less than approximately 100 volts. In another particular embodiment, the low power circuitry includes circuit devices that have power ratings of less than approximately 70 volts. In a particular embodiment, the voltage threshold may be approximately 64 volts. By integrating the surge suppression circuitry within the diode bridge 106, the low power circuitry may include circuit devices having power ratings that are approximately equal to the threshold voltage.

Figure 2:
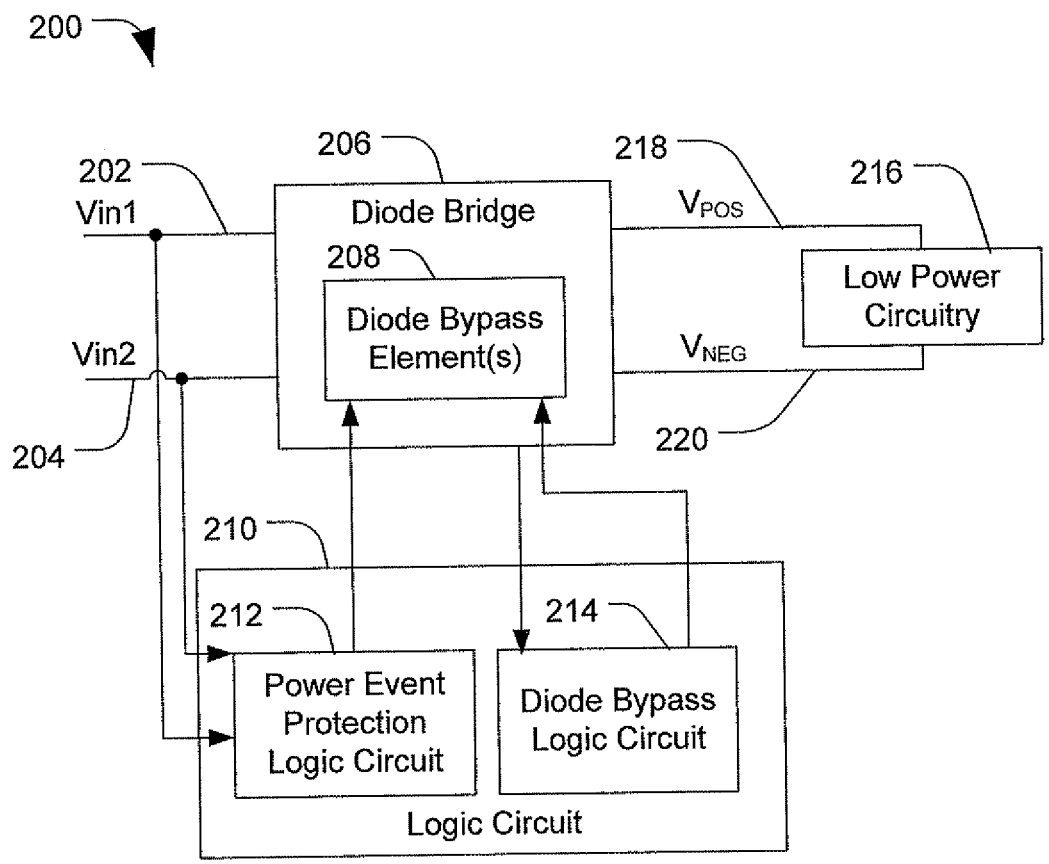
FIG. 2 is a block diagram of a circuit device including an active diode bridge to suppress a power event.

FIG. 2 is a block diagram of a circuit device 200 including an active diode bridge 206 to suppress a transient power surge. The circuit device 200 includes a first voltage input (Vin1) 202 and a second voltage input (Vin2) 204, which are coupled to the active diode bridge 206. The active diode bridge 206 includes one or more diode bypass elements 208. The circuit device 200 includes a logic circuit 210 having a power event protection logic circuit 212 and a diode bypass logic circuit 214, which are coupled to the one or more diode bypass elements 208. The circuit device 200 also includes a first voltage terminal (Vpos) 218 and a second voltage terminal (Vneg) 220, which are coupled to low power circuitry 216.

In a particular embodiment, the diode bypass logic circuit 214 is adapted to detect an operating voltage level at the diode bridge 206 and to selectively activate at least one of the one or more diode bypass elements 208 to bypass forward biased diodes of the diode bridge 206. The power event protection logic circuit 212 is adapted to detect a power surge (or power event) at the first and second input terminals 202 and 204. The power surge or power event refers to detection of an input signal that exceeds a threshold power level, such as a threshold voltage, a threshold current, or any combination thereof. The power event protection logic circuit 212 selectively activates at least one of the one or more diode bypass elements 208 in response to detecting a power event to establish a current path between the first and second input terminals 202 and 204 and to clamp an input voltage at the first and second input terminals 202 and 204 at a voltage level that is at or below the voltage threshold. In a particular embodiment, the voltage threshold may be approximately 64 volts.

In a particular illustrative embodiment, the logic circuit 210 is adapted to reduce power consumption by the diode bridge 206 during normal operation and to protect the low power circuitry 216 from power events, such as an over-voltage event (i.e., a transient voltage surge) or a current surge event (i.e., a transient current spike). By clamping the input voltage at or below the threshold voltage and by shunting excess current between the first and second input terminals 202 and 204, the power event protection logic circuit 212 protects low power circuitry 216 from power surge events that exceed the voltage threshold. Further, the diode bypass elements 208 in conjunction with the power event protection logic circuit 212 may be used to provide surge protection without using external surge suppression circuitry, such as a an external zener diode. In a particular embodiment, diode bypass elements 208 may be metal oxide semiconductor field effect transistor (MOSFET) devices and the diode bridge 206 may be formed from body diodes of the MOSFET devices. The MOSFET devices may operate as an integrated surge protection (suppression) circuit, reducing overall costs relative to a circuit device that is coupled to external surge suppression circuitry.

Figure 3:
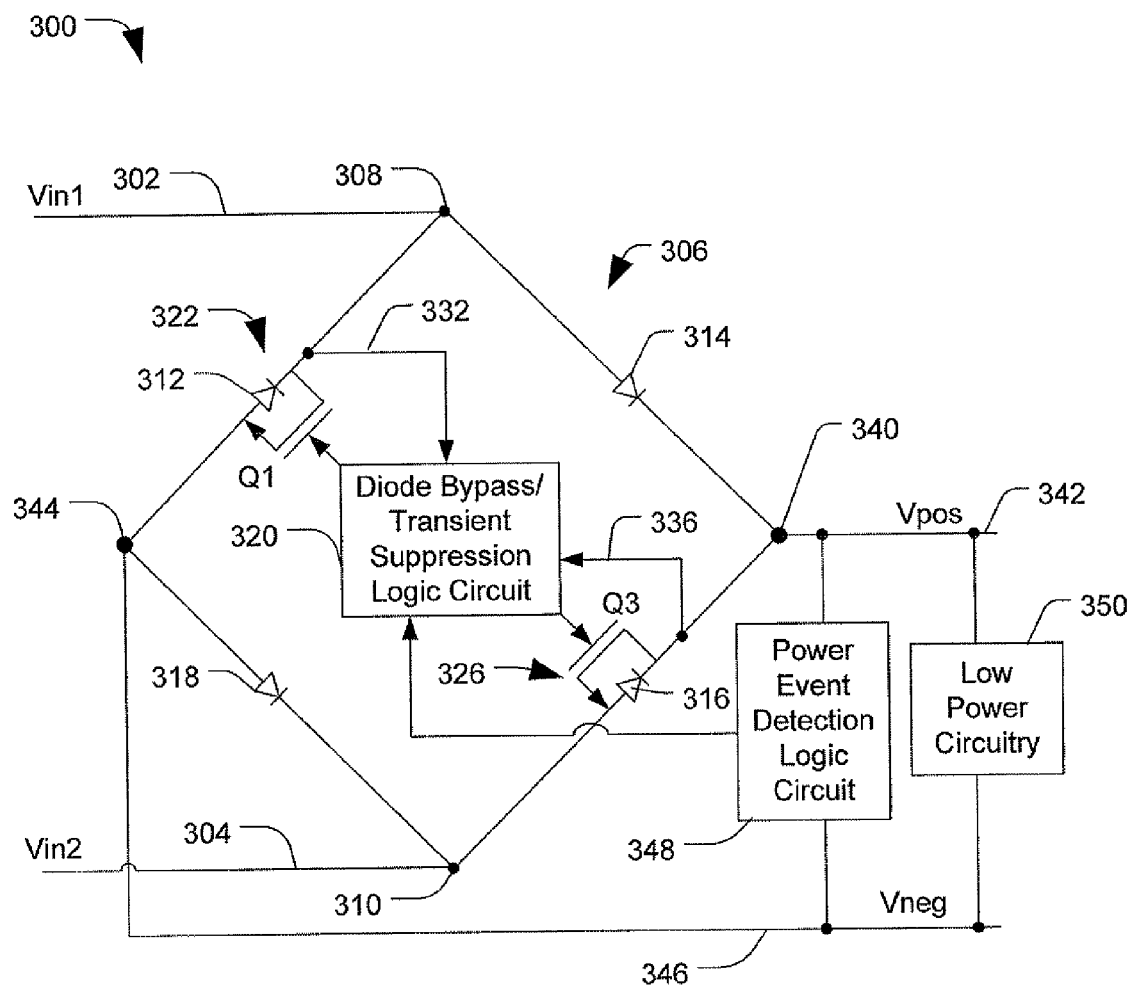
FIG. 3 is a diagram of a particular illustrative embodiment of a circuit device including an active diode bridge to suppress a power event.

FIG. 3 is a diagram of a particular illustrative embodiment of a circuit device 300 including an active diode bridge 306 having integrated surge protection. The active diode bridge 306 is coupled to a first input terminal (Vin1) 302 via a first node 308 and is coupled to a second input terminal (Vin2) 304 via a second node 310. The active diode bridge 306 includes a first diode 312 including an anode terminal coupled to a third node 344 and a cathode terminal coupled to the first node 308. The first diode 312 is a body diode of a first metal oxide semiconductor field effect transistor (MOSFET) device (Q1) 322. The active diode bridge 306 also includes a second diode 314 having an anode terminal coupled to the first node 308 and a cathode terminal coupled to a fourth node 340, a third diode 316 having an anode terminal coupled to the second node 310 and a cathode terminal coupled to the fourth node 340, and a fourth diode 318 having an anode terminal coupled to the third node 344 and a cathode terminal coupled to the second node 310. The third diode 316 is a body diode of a MOSFET device (Q3) 326. The circuit device 300 also includes a diode bypass/transient suppression logic circuit 320 coupled to control terminals of the MOSFET devices 322 and 326. The circuit device 300 also includes a first voltage terminal (Vpos) 342 coupled to the fourth node 340, a second voltage terminal (Vneg) 346 coupled to the third node 344, an power event detection logic circuit 348 coupled between the first and second voltage terminals 342 and 346, and low power circuitry 350 coupled between the first and second voltage terminals 342 and 346.

In a particular embodiment, the diode bridge 306 receives a signal at the first and second input terminals 302 and 304. The diode bridge 306 rectifies the signal to provide a positive power supply to the first voltage terminal 342 and to provide a negative power supply to the second voltage terminal 346. The diode bypass/transient suppression logic circuit 320 detects current flow via the first body diode 312 at the first MOSFET device 322 via a first wire 332 and detects current flow via the second body diode 316 at the second MOSFET device 326 via a second wire 336. If the diode bypass/transient suppression logic circuit 320 detects current flow via the first or second body diodes 312 and 316, the diode bypass/transient suppression logic circuit 320 selectively activates the respective MOSFET device 322 or 326 to reduce power consumption via the active body diode 312 or 316.

In a particular embodiment, the power event detection logic circuit 348 is adapted to detect a power surge event at the first and second voltage terminals 342 and 346 and to send a surge event detection signal to the diode bypass/transient suppression logic circuit 320. In a particular embodiment, in response to receiving a surge event detection signal, the diode bypass/transient suppression logic circuit 320 is adapted to selectively activate the first and second MOSFET devices 322 and 326 to shunt excess current between the first and second input terminals 302 and 304. Additionally, by activating the first and second MOSFET devices 322 and 326, a voltage at the first and second input terminals 302 and 304 is clamped to a threshold voltage level, which may be determined by an integrated zener diode associated with the power event detection logic 348.

Figure 4:
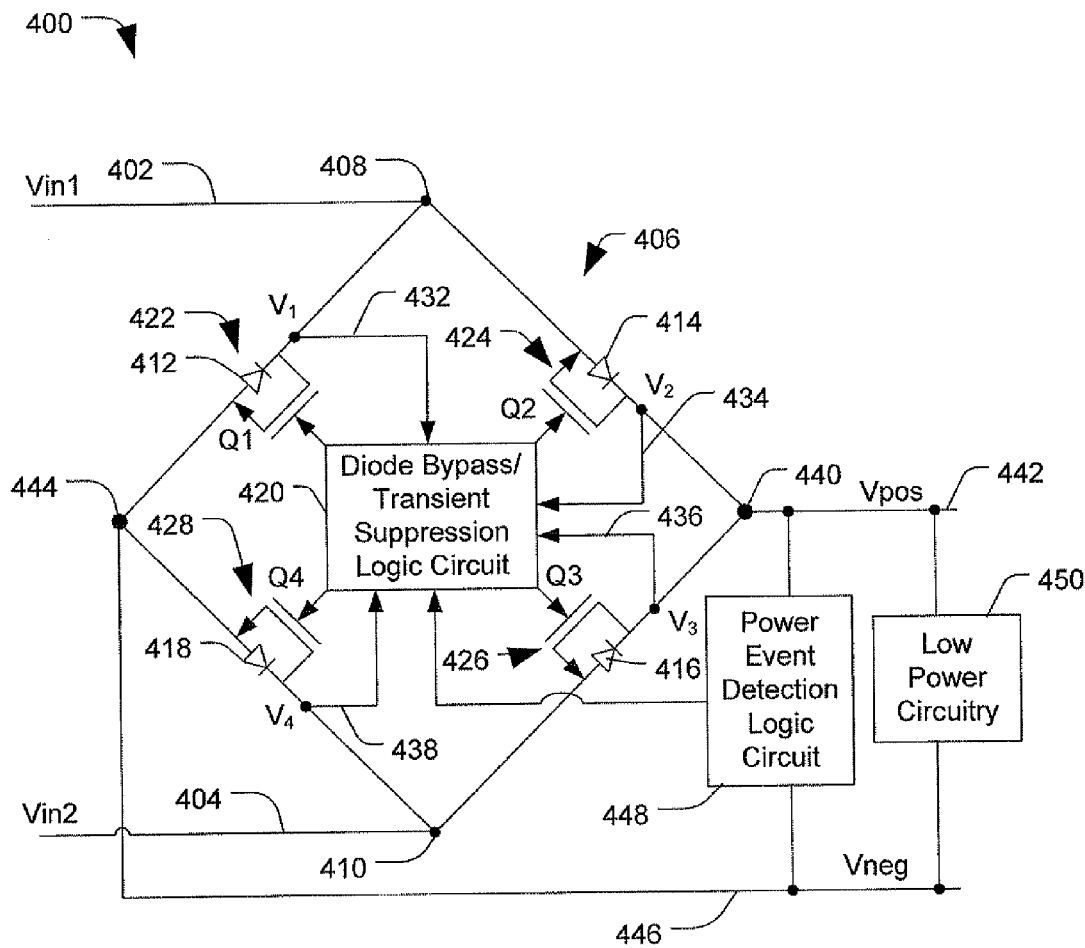
FIG. 4 is a diagram of a second particular illustrative embodiment of a circuit device including an active diode bridge to suppress a power event.

FIG. 4 is a diagram of a second particular illustrative embodiment of a circuit device 400 including active diode bridge 406 having integrated surge protection. The active diode bridge 406 is coupled to a first input terminal (Vin1) 402 via a first node 408 and is coupled to a second input terminal (Vin2) 404 via a second node 410. The active diode bridge 406 includes a first diode 412 including an anode terminal coupled to a third node 444 and a cathode terminal coupled to the first node 408. The first diode 412 is a body diode of a first metal oxide semiconductor field effect transistor (MOSFET) device (Q1) 422. The active diode bridge 406 also includes a second diode 414 having an anode terminal coupled to the first node 408 and a cathode terminal coupled to a fourth node 440, a third diode 416 having an anode terminal coupled to the second node 410 and a cathode terminal coupled to the fourth node 440, and a fourth diode 418 having an anode terminal coupled to the third node 444 and a cathode terminal coupled to the second node 410. The second diode 414 is a body diode of a MOSFET device (Q2) 424. The third diode 416 is a body diode of a MOSFET device (Q3) 426. The fourth diode 418 is a body diode of a MOSFET device (Q4) 428.

The circuit device 400 also includes a diode bypass/transient suppression logic circuit 420 coupled to control terminals of the first, second, third, and fourth MOSFET devices 422, 424, 426, and 428, respectively. The circuit device 400 also includes a first voltage terminal (Vpos) 442 coupled to the fourth node 440, a second voltage terminal (Vneg) 446 coupled to the third node 444, a power event detection logic circuit 448 coupled between the first and second voltage terminals 442 and 446, and low power circuitry 450 coupled between the first and second voltage terminals 442 and 446. The diode bypass/transient suppression logic circuit 420 includes a first detection input 432 coupled to the cathode terminal of the first diode 412, a second detection input 434 coupled to the cathode terminal of the second diode 414, a third detection input 436 coupled to the cathode terminal of the third diode 416, and a fourth detection input 438 coupled to the cathode terminal of the fourth diode 418.

In a particular illustrative embodiment, the body diodes 412, 414, 416, and 418 may be used to provide initial rectification of an input signal at the first and second input terminals 402 and 404 until control circuitry, such as the diode bypass/transient suppression logic circuit 420 is energized. Once the diode bypass/transient suppression logic circuit 420 is active, the diode bypass/transient suppression logic circuit 420 is adapted to selectively activate one or more of the MOSFET devices 422, 424, 426, and 428 to provide a diode bypass current path via at least one of the respective MOSFET devices 422, 424, 426 and 428, reducing overall power consumption of the diode bridge 406. In a particular embodiment, the diode bypass/transient suppression logic circuit 420 determines which of the body diodes 412, 414, 416, and 418 are conducting current based on the current at the detection inputs 432, 434, 436 and 438 and selectively activates two of the MOSFET devices 422, 424, 426, and 428 based on the determination. For example, if the second and fourth body diodes 414 and 418 are active, the diode bypass/transient suppression logic circuit 420 is adapted to selectively activate the second and fourth MOSFET devices 424 and 428 to provide a diode bypass current path in the active current path.

In a particular embodiment, if the power event detection logic 448 detects a power event, the power event detection logic 448 provides a signal to the diode bypass/transient suppression logic circuit 420. In a particular embodiment, the diode bypass/transient suppression logic circuit 420 is adapted to activate the first, second, third and fourth MOSFET devices 422, 424, 426, and 428 to shunt excess current between the first and second input terminals 402 and 404 and to clamp an input voltage at the first and second input terminals 402 and 404 to a voltage level.

In a particular embodiment, the voltage level may be determined by the power event detection logic circuit 448. For example, the voltage level may be related to a breakdown voltage level of an integrated zener diode.

In a particular example, the first, second, third, and fourth MOSFET devices 422, 424, 426, and 428 are n-channel MOSFET devices. In general, the first, second, third, and fourth MOSFET devices 422, 424, 426, and 428 can operate in a reverse active mode. For example, if the source (node 444) of the fourth MOSFET device 428 is biased above the drain (node 410), the fourth MOSFET device 428 would normally be turned off. However, if a voltage at the control terminal of the fourth MOSFET device 428 is raised to a level that is greater than the source, the fourth MOSFET device 428 is activated. In a particular example, to activate the first, second, third, and fourth MOSFET devices 422, 424, 426, and 428, the diode bypass/transient suppression logic circuit 420 may include a charge pump (not shown) to raise the voltage level at the control terminal of a selected MOSFET device.

Figure 5:
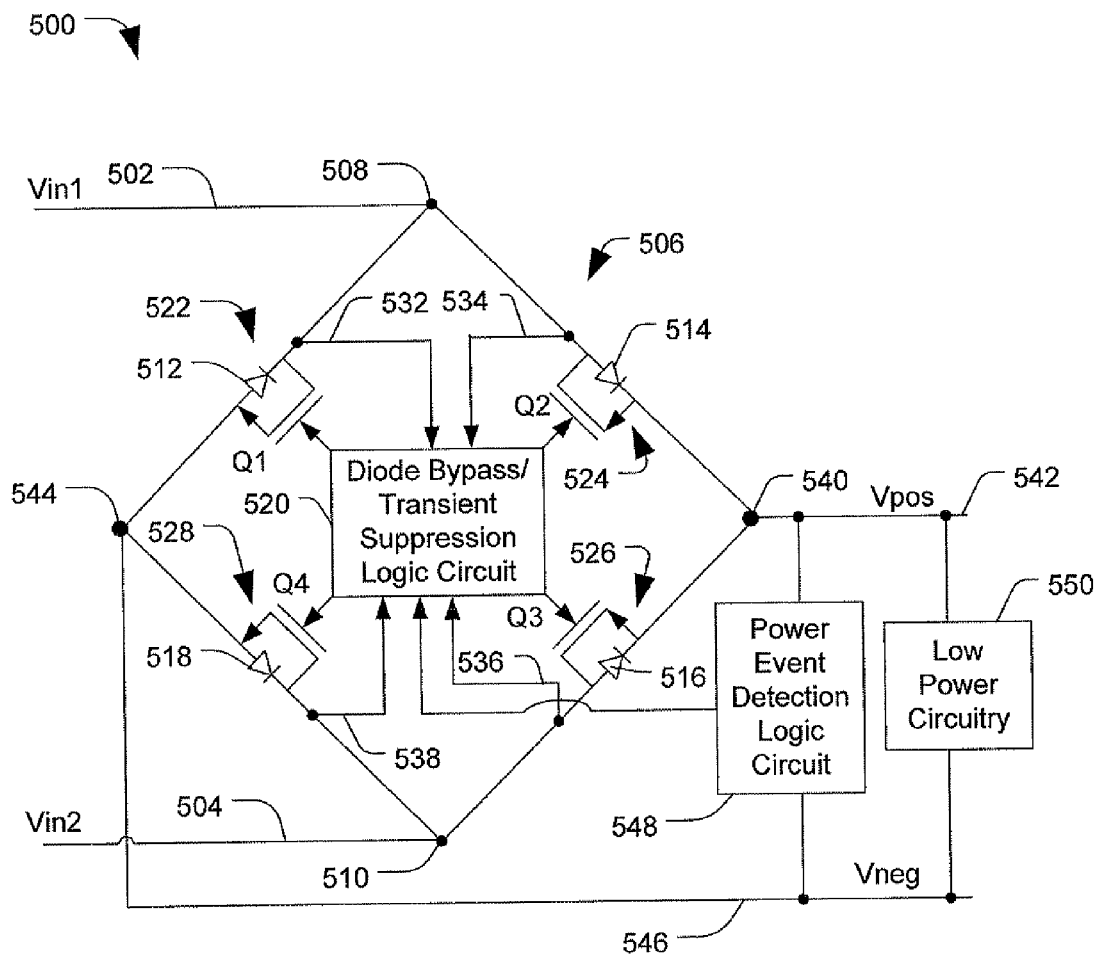
FIG. 5 is a diagram of a third particular illustrative embodiment of a circuit device including an active diode bridge to suppress a power event.

FIG. 5 is a diagram of a third particular illustrative embodiment of a circuit device 500 including active diode bridge 506 having integrated surge protection. The active diode bridge 506 is coupled to a first input terminal (Vin1) 502 via a first node 508 and is coupled to a second input terminal (Vin2) 504 via a second node 510. The active diode bridge 506 includes a first diode 512 including an anode terminal coupled to a third node 544 and a cathode terminal coupled to the first node 508. The first diode 512 is a body diode of a first metal oxide semiconductor field effect transistor (MOSFET) device (Q1) 522. The active diode bridge 506 also includes a second diode 514 having an anode terminal coupled to the first node 508 and a cathode terminal coupled to a fourth node 540, a third diode 516 having an anode terminal coupled to the second node 510 and a cathode terminal coupled to the fourth node 540, and a fourth diode 518 having an anode terminal coupled to the third node 544 and a cathode terminal coupled to the second node 510. The second diode 514 is a body diode of a MOSFET device (Q2) 524. The third diode 516 is a body diode of a MOSFET device (Q3) 526. The fourth diode 518 is a body diode of a MOSFET device (Q4) 528. In a particular illustrative embodiment, the second and third MOSFET devices 524 and 526 are p-channel MOSFET devices, and the first and fourth MOSFET devices 522 and 528 are n-channel MOSFET devices.

The circuit device 500 also includes a diode bypass/transient suppression logic circuit 520 coupled to control terminals of the first, second, third, and fourth MOSFET devices 522, 524, 526, and 528, respectively. The circuit device 500 also includes a first voltage terminal (Vpos) 542 coupled to the fourth node 540, a second voltage terminal (Vneg) 546 coupled to the third node 544, an power event detection logic circuit 548 coupled between the first and second voltage terminals 542 and 546, and low power circuitry 550 coupled between the first and second voltage terminals 542 and 546. The diode bypass/transient suppression logic circuit 520 includes a first detection input 532 coupled to the cathode terminal of the first diode 512, a second detection input 534 coupled to the cathode terminal of the second diode 514, a third detection input 536 coupled to the cathode terminal of the third diode 516, and a fourth detection input 538 coupled to the cathode terminal of the fourth diode 518.

In a particular embodiment, the diode bridge 506 receives a signal at the first and second input terminals 502 and 504. The diode bridge 506 rectifies the signal to provide a positive power supply to the first voltage terminal 542 and to provide a negative power supply to the second voltage terminal 546. The diode bypass/transient suppression logic circuit 520 detects a voltage level at each of the first, second, third, and fourth MOSFET devices 522, 524, 526, and 528 via the respective detection inputs 532, 534, 536, and 538 and determines which of the diodes are active based on the voltage levels. The diode bypass/transient suppression logic circuit 520 is adapted to selectively activate at least one of the first, second, third, and fourth MOSFET devices 522, 524, 526, and 528 to bypass the active (forward biased) diodes. For example, if the second and fourth diodes 514 and 518 are active, current flows from the first input terminal 502 to the first voltage terminal 542 via the first diode 514 and from the second voltage terminal 546 to the second input terminal 504 via the fourth diode 518. The diode bypass/transient suppression logic circuit 520 is adapted to selectively activate the second and fourth MOSFET devices 524 and 528 to provide a diode bypass current path, thereby reducing power consumption by the second and fourth diodes 514 and 518.

In a particular embodiment, if the power event detection logic 548 detects a power event, the power event detection logic 548 provides a signal to the diode bypass/transient suppression logic circuit 520. In a particular embodiment, the diode bypass/transient suppression logic circuit 520 is adapted to activate the first, second, third and fourth MOSFET devices 522, 524, 526, and 528 to shunt excess current between the first and second input terminals 502 and 504 and to clamp an input voltage at the first and second input terminals 502 and 504 to a voltage level. In a particular embodiment, the voltage level may be determined by the power event detection logic circuit 548. In another particular embodiment, the second and fourth diodes 514 and 518 may be active and the second and fourth MOSFET devices 524 and 528 may be activated based on second and fourth voltage levels received from the second and fourth detection inputs 534 and 538, respectively.

In response to detecting a power event, the power event detection logic circuit 548 provides a signal to the diode bypass/transient suppression logic circuit 520 to activate the first and second MOSFET devices 522 and 526, shunting excess current between the first and second input terminals 502 and 504 and clamping the input voltage at the first and second input terminals 502 and 504 to a voltage level. In a particular embodiment, the voltage level may be related to a breakdown voltage level of an integrated zener diode.

In a particular embodiment, the diode bypass/transient suppression logic circuit 520 is adapted to activate the first and second MOSFET devices 524 and 526 by applying a zero voltage or a negative voltage to the respective control terminals. In a particular illustrative embodiment, the diode bypass/transient suppression logic circuit 520 provides a first control signal that is less than a positive voltage at the first voltage terminal 542 to the second MOSFET device 524 to activate the second MOSFET device 524 and provides a second control signal to the fourth MOSFET device 528 to activate the fourth MOSFET device 528. In this particular example, the diode bypass/transient suppression logic circuit 520 does not include a charge pump.

In a particular embodiment, the diode bypass/transient suppression logic circuit 520 is adapted to compare a first voltage level at the first MOSFET device 522 via the first detection input 532 to a fourth voltage level at the fourth MOSFET device 528 via the fourth detection input 538. If the first voltage level is greater than the fourth voltage level, the diode bypass/transient suppression logic circuit 520 activates the fourth MOSFET device 528. In contrast, if the fourth voltage level is greater than the first voltage level, the diode bypass/transient suppression logic circuit 520 activates the first MOSFET device 522. In another particular embodiment, the diode bypass/transient suppression logic circuit 520 is adapted to compare a second voltage level at the second MOSFET device 524 via the second detection input 534 and a third voltage level at the third MOSFET device 526 via the third detection input 536. If the third voltage level is less than the second voltage level, then the third MOSFET device 526 is turned off and the second MOSFET device 524 is activated. Otherwise, the third MOSFET device 526 is activated and the second MOSFET device 524 is turned off.

In a particular embodiment, in response to detecting a power event, the diode bypass/transient suppression logic circuit 520 activates the first, second, third, and fourth MOSFET devices 522, 524, 526, and 528, establishing a shunt current path between the first and second input terminals 502 and 504. In this example, it is not necessary to determine the polarity of the power event, because the diode bridge 506 handles the power event.

Figure 6:
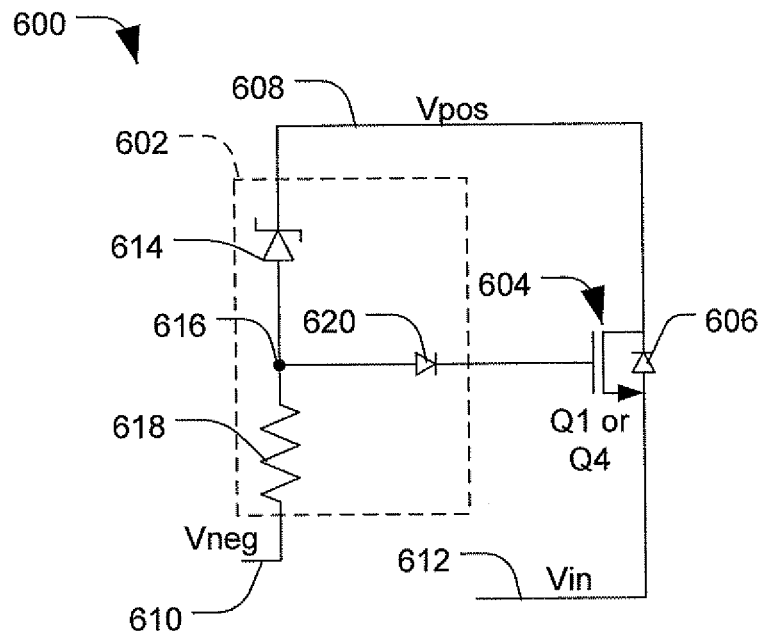
FIG. 6 is a diagram of a particular illustrative embodiment of a logic circuit to activate an n-channel metal oxide semiconductor field effect transistor (MOSFET) device to suppress a power event.

FIG. 6 is a diagram of a particular illustrative embodiment of a circuit device 600 including a logic circuit 602 to activate an n-channel metal oxide semiconductor field effect transistor (MOSFET) device 604 in response to a power event. The logic circuit 600 includes a transient suppression logic circuit 602 coupled to a control terminal of a MOSFET device 604 including a body diode 606 that is part of an active diode bridge. The MOSFET device 604 includes a drain (i.e., a cathode of the body diode 606) that is coupled to a first voltage terminal (Vpos) 608 and a source (i.e., an anode of the body diode 606) that is coupled to an input terminal (Vin) 612). The transient suppression logic circuit 602 includes a zener diode 614 including a cathode terminal coupled to the first voltage terminal (Vpos) 608 and an anode terminal coupled to a node 616. The transient suppression logic circuit 602 also includes a resistor 618 coupled between the node 616 and a second voltage terminal (Vneg) 610. The transient suppression logic circuit 602 also includes a diode 620 including an anode terminal coupled to the node 616 and a cathode terminal coupled to a control terminal of the MOSFET device 604.

In a particular embodiment, when a differential voltage between the first and second voltage terminals 608 and 610 is greater than a breakdown voltage of the zener diode 614, the zener diode 614 conducts current and a voltage level at the node 616 increases, activating the MOSFET device 604 to shunt current from the first voltage terminal 608 to the input terminal 612.

Figure 7:
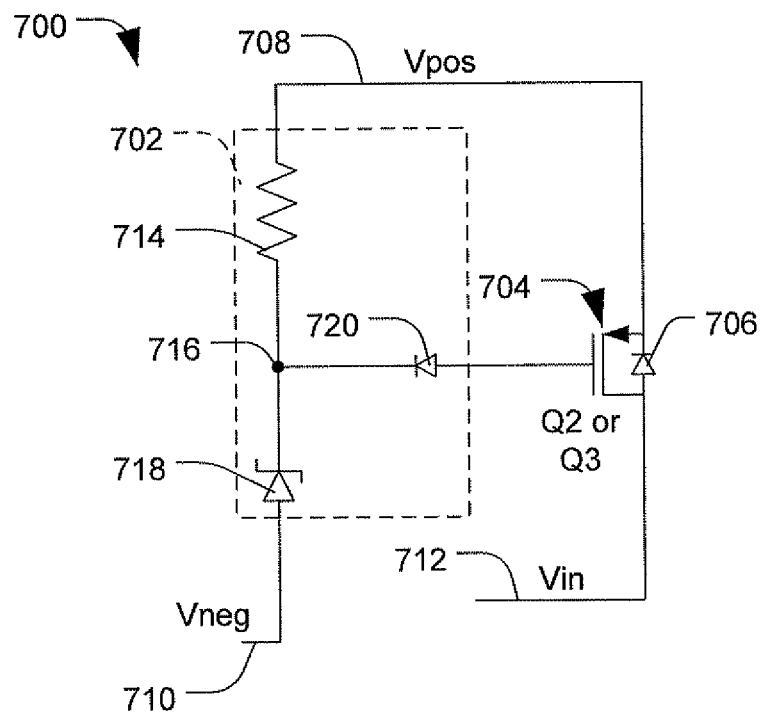
FIG. 7 is a diagram of a particular illustrative embodiment of a logic circuit to activate a p-channel MOSFET device to suppress a power event.

FIG. 7 is a diagram of a particular illustrative embodiment of a circuit device 700 including a logic circuit 702 to activate a p-channel MOSFET device 704 in response to detection of a power event. The circuit device 700 includes a first voltage terminal (Vpos) 708, a second voltage terminal (Vneg) 710, and an input terminal (Vin) 712. The p-channel MOSFET device 704 includes a body diode 706 that is part of a diode bridge. The MOSFET device 704 includes a source (i.e., a cathode of the body diode 706) that is coupled to a first voltage terminal (Vpos) 708 and a drain (i.e., an anode of the body diode 706) that is coupled to an input terminal (Vin) 712). The transient suppression logic circuit 702 includes a zener diode 718 including a cathode terminal coupled to a node 716 and an anode terminal coupled to a second voltage terminal (Vneg) 710. The transient suppression logic circuit 702 also includes a resistor 714 coupled between the node 716 and a first voltage terminal (Vpos) 708. The transient suppression logic circuit 702 also includes a diode 720 including an anode terminal coupled to a control terminal of the MOSFET device 706 and a cathode terminal coupled to the node 716.

In a particular embodiment, during normal operation, if a voltage at the input terminal 712 is positive, the body diode 706 is forward biased. When a voltage differential between the first and second voltage terminals 708 and 710 exceeds a breakdown voltage of the zener diode 718, the zener diode conducts current and a voltage at the control terminal of the MOSFET device 704 is pulled down. When a voltage at the control terminal (i.e., at the anode of the diode 720) is pulled down below a voltage at the first terminal 708, the MOSFET device 704 is activated to shunt excess current between the first voltage terminal 708 and the first input terminal 712. Additionally, a voltage differential between the first and second terminals 708 and 710 is clamped at a voltage level that is a little higher than the breakdown voltage of the zener diode 718. In a particular example, if the zener diode 718 has a breakdown voltage of approximately 62 volts, the voltage level may be clamped at approximately 63 volts (i.e., approximately one diode voltage drop higher than the breakdown voltage level).

In a particular embodiment, the circuit devices 600 and 700 of FIGS. 6 and 7 are included in the diode bypass/transient suppression logic circuits 320, 420, and 520 and in the power event detection logic circuits 348, 448, and 548 illustrated in FIGS. 3, 4, and 5 respectively. In a particular embodiment, the circuit devices 600 and 700 illustrated in FIGS. 6 and 7 may be included in an active diode bridge, such as the active diode bridge 506 illustrated in FIG. 5.

Figure 8:
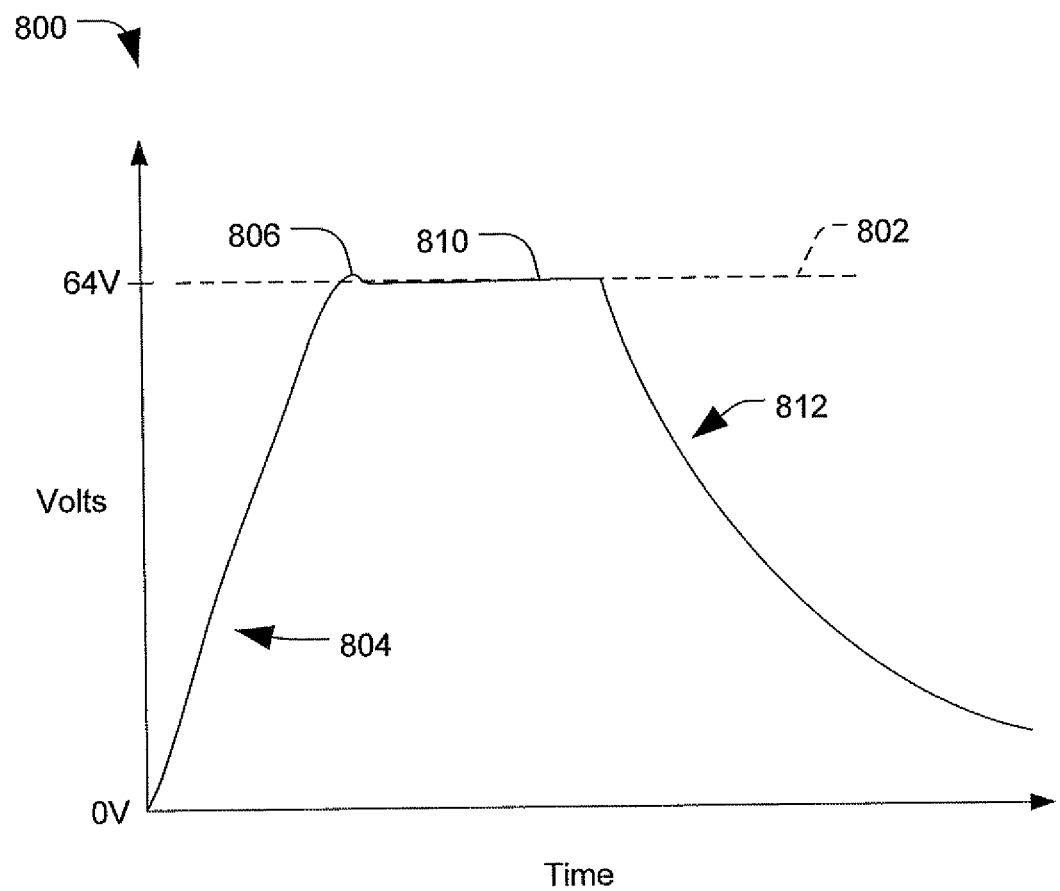
FIG. 8 is a representative graph illustrating a voltage surge event where an active diode bridge is activated to clamp an input voltage to suppress a power event.

FIG. 8 is a representative graph 800 illustrating a power event where an active diode bridge is activated to clamp an input voltage. The graph 800 illustrates a threshold voltage 802 at approximately 64 volts. An input voltage (generally indicated at 804) is received. The input voltage 804 rises to a voltage level at 806 that exceeds the voltage threshold 802. When the input voltage 804 exceeds the threshold voltage 802, the diode bypass/transient suppression logic circuitry activates one or more diode bypass elements associated with a diode bridge to clamp the input voltage to a clamped voltage level (generally indicated at 810) that is approximately at or below the voltage threshold 802. After the power event subsides, the input voltage 804 decreases exponentially at 812.

In a particular embodiment, the diode bypass/transient suppression logic circuit is adapted to shunt excess current and to clamp the input voltage at a voltage level that is at or below a voltage rating for other circuitry that is coupled to the diode bridge. In a particular embodiment, the input voltage at 812 may decrease to an operating voltage level, such as a voltage level that is within a range of 36 volts to 57 volts.

Figure 9:
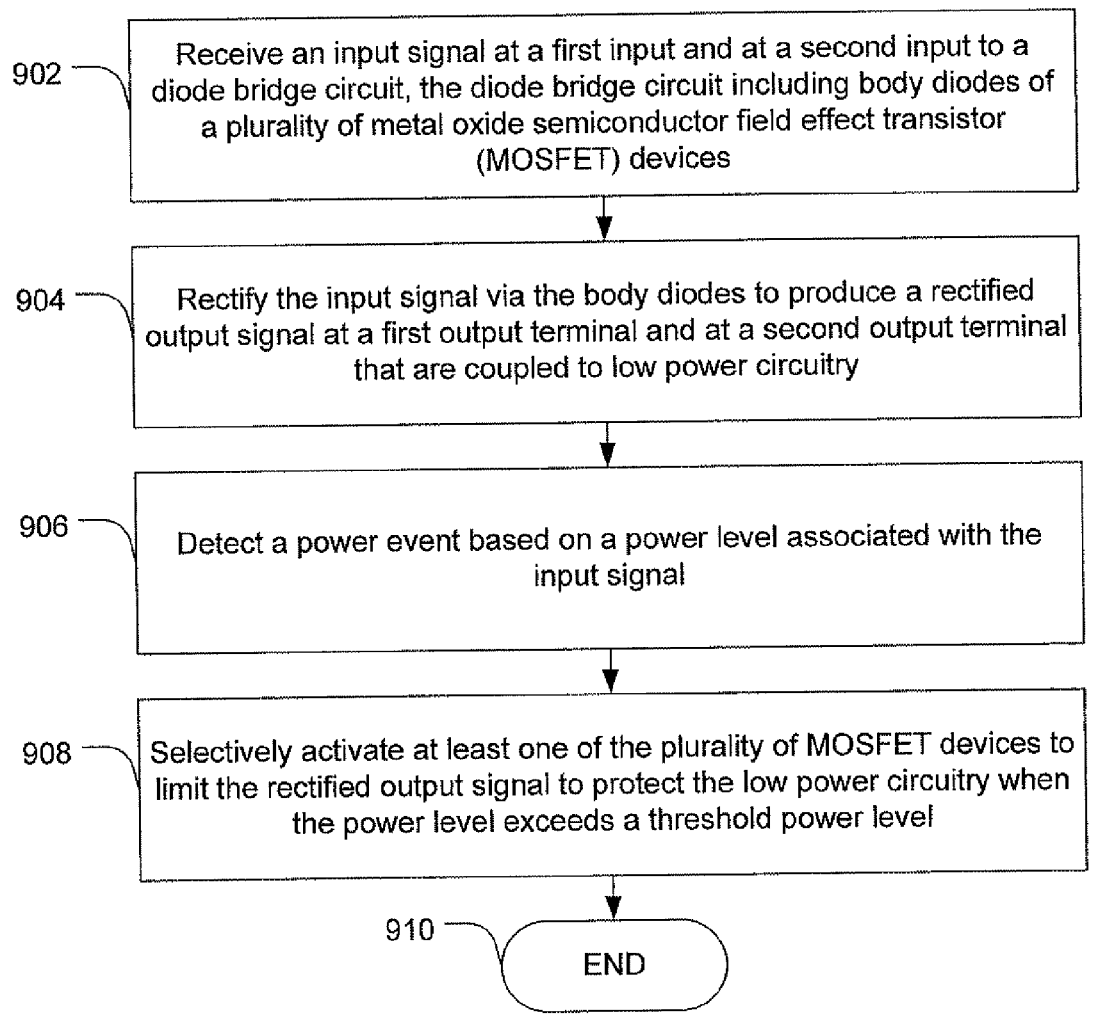
FIG. 9 is a flow diagram of a particular illustrative embodiment of a method of suppressing a power event.

FIG. 9 is a flow diagram of a particular illustrative embodiment of a method of suppressing a transient power surge. At 902, an input signal is received at a first input and a second input to a rectifier circuit, where the rectifier circuit includes body diodes of a plurality metal oxide semiconductor field effect transistor (MOSFET) devices. Advancing to 904, the input signal is rectified via the body diodes to produce a rectified output signal at a first output terminal and a second output terminal, where the first and second output terminals are coupled to low power circuitry. Continuing to 906, a power surge event is detected based on a power level associated with the input signal. In a particular embodiment, the power level represents a voltage level. In another particular embodiment, the power level represents a current level. Proceeding to 908, the method includes selectively activating at least one of the plurality of MOSFET devices to limit the rectified output signal to protect the low power circuitry when the power level exceeds a threshold power level. In a particular embodiment, two or more of the MOSFET devices may be activated to couple the first input to the second input, clamping the input voltage to a voltage level that is at or below a threshold voltage level and/or shunting an input current between the first and second inputs. In another particular embodiment, selectively activating at least one of the MOSFET devices includes activating a first MOSFET device and a second MOSFET device that have respective body diodes that are reverse biased. The method terminates at 910.

In a particular embodiment, the input signal is rectified by selectively activating at least one of the plurality of MOSFET devices to bypass a body diode that is forward biased when the power level of the input signal is less than or equal to the threshold power level. In a particular embodiment, the threshold power level is a breakdown voltage of a zener diode, and the low power circuitry includes one or more circuit devices having a power rating that is greater than or equal to the threshold power level.

Figure 10:
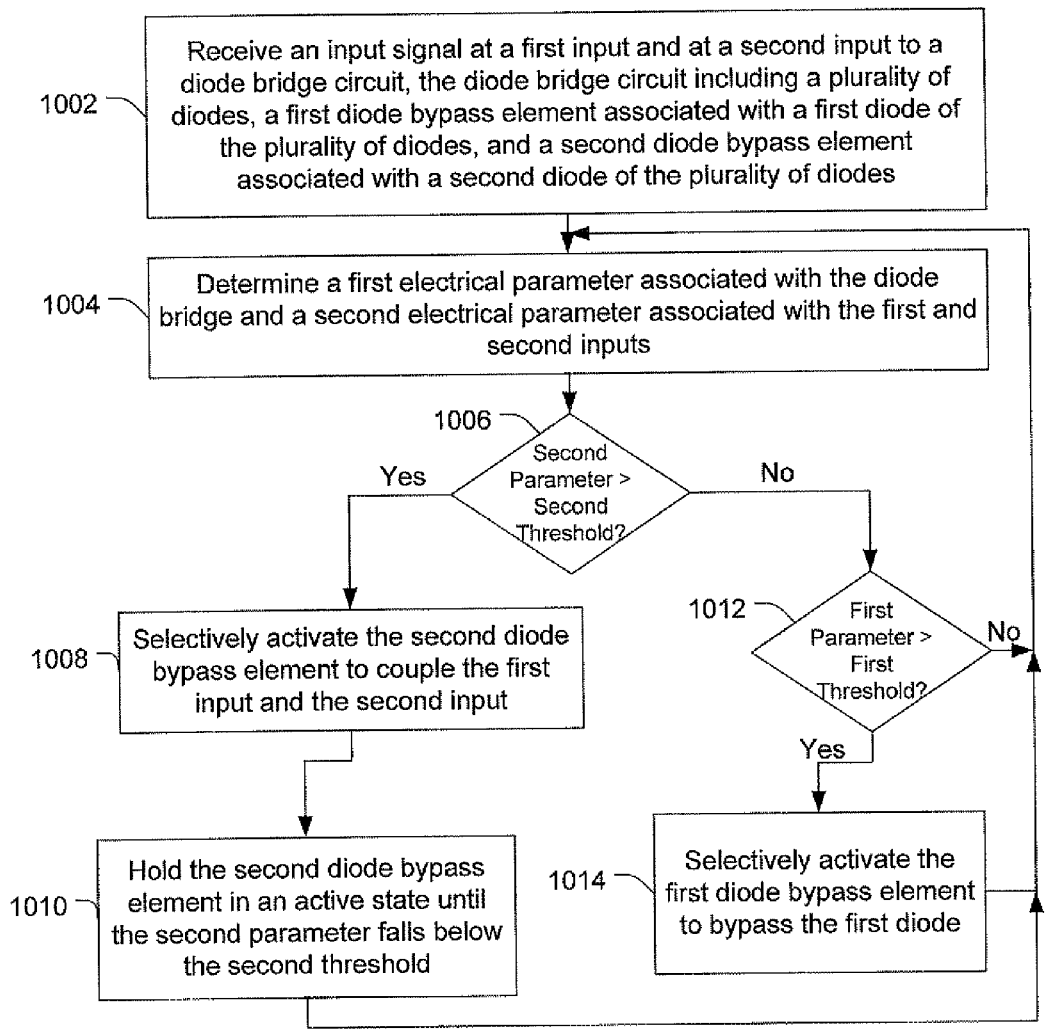
FIG. 10 is a flow diagram of a second particular illustrative embodiment of a method of suppressing a power event.

FIG. 10 is a flow diagram of a second particular illustrative embodiment of a method of suppressing a transient power event. At 1002, an input signal is received at a first input and at a second input to a diode bridge circuit, where the diode bridge circuit includes a plurality of diodes, a first diode bypass element associated with a first diode of the plurality of diodes, and a second diode bypass element associated with a second diode of the plurality of diodes. Continuing to 1004, a first electrical parameter associated with the diode bridge and a second electrical parameter associated with the first and second inputs are determined. In a particular embodiment, the first threshold represents an operating power level, which may have a voltage level within a range from 36 volts to 57 volts and a current level below 400 mA. The second threshold represents a power level that has a voltage greater than 64 volts, a current greater than 400 mA, or a power level that is greater than 36 Watts. In another particular embodiment, the second threshold represents a power level that is greater than 16 Watts. Moving to 1006, if the second electrical parameter is greater than a second threshold, the method advances to 1008 and the second diode bypass element is selectively activated to couple the first input and the second input. Continuing to 1010, the second bypass element is held in an active state until the second parameter falls below the second threshold. The method returns to 1004 and a first electrical parameter associated with the diode bridge and a second electrical parameter associated with the first and second inputs are determined.

Returning to 1006, if the second electrical parameter is not greater than the second threshold, the method advances to 1012 and the first electrical parameter is compared to a first threshold. If the first electrical parameter is greater than the first threshold, the method advances to 1014 and the first diode bypass element is selectively activated to bypass the first diode of the plurality of diodes. The method returns to 1004 and a first electrical parameter associated with the diode bridge and a second electrical parameter associated with the first and second inputs are determined. At 1012, if the first electrical parameter is less than the first threshold, the method returns to 1004.

In a particular embodiment, the second diode bypass element is adapted to shunt excess current between the first input and the second input and to clamp a voltage between the first and second inputs at a voltage level that is at or below the second threshold. In a particular embodiment, the voltage level is clamped at or below 64 volts.

Figure 11:
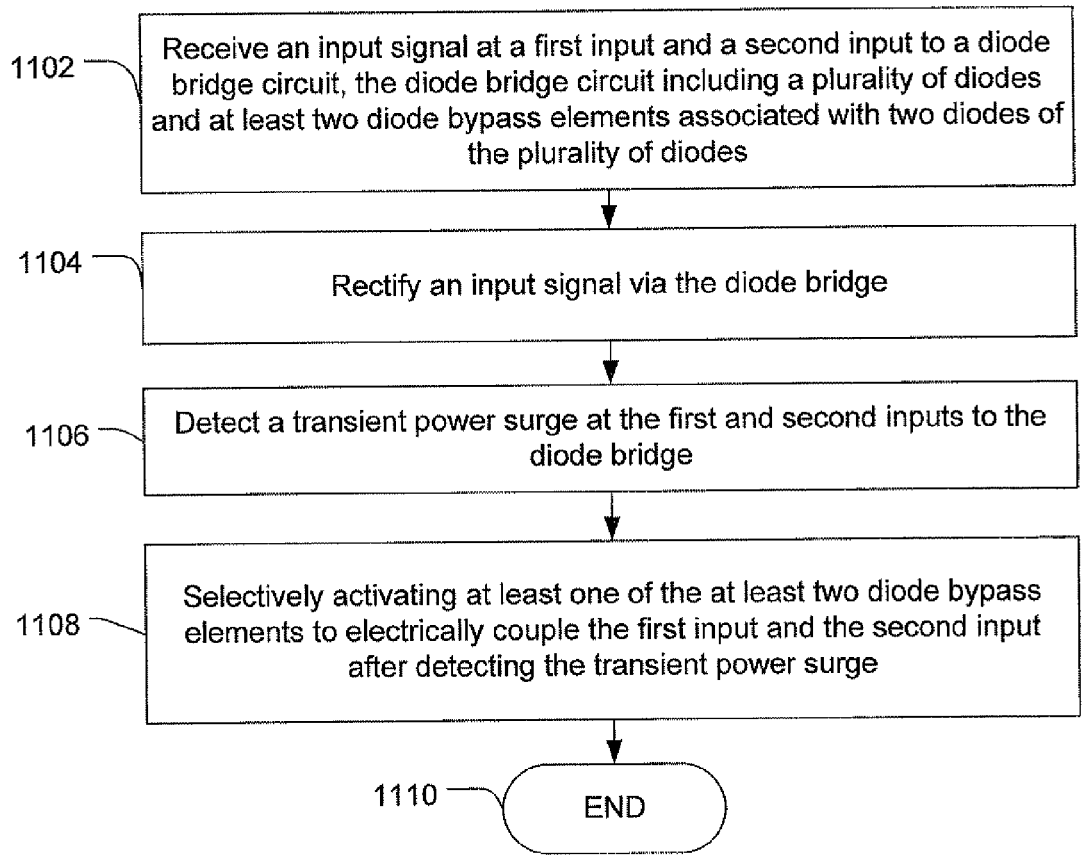
FIG. 11 is a flow diagram of a third particular illustrative embodiment of a method of suppressing a power event.

FIG. 11 is a flow diagram of a third particular illustrative embodiment of a method of suppressing a transient power surge. At 1102, an input signal is received at a first input and at a second input to a diode bridge circuit that includes a plurality of diodes and at least two diode bypass elements associated with two diodes of the plurality of diodes. Continuing to 1104, an input signal is rectified via the diode bridge. Advancing to 1106, a transient power event is detected at the first and second inputs to the diode bridge. Proceeding to 1108, at least one of the two diode bypass elements is selectively activated after detecting the transient power event to electrically couple the first input and the second input. In a particular embodiment, the diode bypass element is selectively activated to shunt an input current between the first and second inputs and to clamp an input voltage at a voltage level that is at or below a voltage rating of circuitry that is coupled to output terminals of the diode bridge. In a particular embodiment, the diode bypass element is activated in response to detecting the transient power event. The method terminates at 1110.

Those of skill would further appreciate that the various illustrative logical blocks, configurations, modules, circuits, and algorithm steps described in connection with the embodiments disclosed herein may be implemented as electronic hardware, computer software, or combinations of both. To clearly illustrate this interchangeability of hardware and software, various illustrative components, blocks, configurations, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The previous description of the disclosed embodiments is provided to enable any person skilled in the art to make or use the disclosed embodiments. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope possible consistent with the principles and novel features as defined by the following claims.

What is claimed is:

1. A circuit device comprising:
   a diode bridge including a first power input and a second power input and including a first output terminal and a second output terminal, the diode bridge comprising a plurality of diodes and a respective plurality of diode bypass elements associated with the plurality of diodes; and
   a logic circuit to detect a power event at the first and second power inputs and to selectively activate one or more of the respective plurality of diode bypass elements in response to detecting the power event to limit a rectified power supply at the first and second output terminals.

2. The circuit device of claim 1, wherein each of the plurality of diodes comprises an integrated diode of a respective diode bypass element.

3. The circuit device of claim 1, wherein the power event comprises an input surge current at the first and second power inputs, and wherein the logic circuit is adapted to selectively activate the one or more of the respective plurality of diode bypass elements to shunt the input surge current between the first power input and the second power input when the input surge current exceeds a threshold current level.

4. The circuit device of claim 1, wherein the power event comprises a transient voltage at the first and second power inputs, and wherein the logic circuit is adapted to selectively activate the one or more of the respective plurality of diode bypass elements to clamp the transient voltage to a voltage level that is less than or equal to a threshold voltage level when the transient voltage exceeds a threshold voltage level.

5. The circuit device of claim 4, further comprising a zener diode coupled between the first and second output terminals having a breakdown voltage that determines the threshold voltage level.

6. The circuit device of claim 1, wherein the diode bridge comprises:
   a first body diode of a first metal oxide semiconductor field effect transistor (MOSFET) device;
   a second body diode of a second MOSFET device;
   a third body diode of a third MOSFET device; and
   a fourth body diode of a fourth MOSFET device.

7. The circuit device of claim 6, wherein the first body diode comprises a first anode terminal coupled to the first power input and a first cathode terminal coupled to the first output terminal, wherein the second body diode comprises a second anode terminal coupled to the second output terminal and a second cathode terminal coupled to the first power input, wherein the third body diode comprises a third anode terminal coupled to the second power input and a third cathode terminal coupled to the first output terminal, and wherein the fourth body diode comprises a fourth anode terminal coupled to the second output terminal and a fourth cathode terminal coupled to the second power input.

8. The circuit device of claim 6, wherein the first MOSFET device and the third MOSFET device comprise p-channel MOSFET devices, and wherein the second MOSFET device and the fourth MOSFET device comprise n-channel MOSFET devices.

9. A circuit device comprising:
   an interface responsive to a power over Ethernet network, the interface including a first input terminal and a second input terminal;
   a rectifier circuit coupled to the first and second input terminals to receive a power input and to provide a positive power supply to a first power terminal and a negative power supply to a second power terminal, the rectifier circuit comprising:
      a first metal oxide semiconductor field effect transistor (MOSFET) device having a first body diode, the first body diode including a first anode terminal coupled to the second power terminal and a first cathode terminal coupled to the first input terminal;
      a second MOSFET device having a second body diode, the second body diode including a second anode terminal coupled to the first input terminal and a second cathode terminal coupled to the first power terminal;
      a third MOSFET device having a third body diode, the third body diode including a third anode terminal coupled to the second input terminal and a third cathode terminal coupled to the first power terminal; and
      a fourth MOSFET device having a fourth body diode, the fourth body diode including a fourth anode terminal coupled to the second power terminal and a fourth cathode terminal coupled to the second input terminal; and
   a logic circuit coupled to the first, second, third, and fourth MOSFET devices, the logic circuit adapted to detect a power event at the first and second inputs and to selectively activate at least one of the first, second, third, and fourth MOSFET devices in response to detecting the power event to suppress the power event to a power level that is at or below a threshold power level.

10. The circuit device of claim 9, wherein the first and fourth MOSFET devices comprise n-channel MOSFET devices.

11. The circuit device of claim 9, wherein the second and third MOSFET devices comprise p-channel MOSFET devices.

12. The circuit device of claim 9, wherein the logic circuit is adapted to compare voltage levels associated with the first, second, third, and fourth cathode terminals and to selectively activate at least one of the first, second, third, and fourth MOSFET devices based on the comparison.

13. The circuit device of claim 12, wherein the logic circuit is adapted to compare a first voltage level associated with the first cathode terminal with a fourth voltage level associated with the fourth cathode terminal, the logic circuit to activate the fourth MOSFET device when the first voltage level is greater than the fourth voltage level and to activate the first MOSFET device when the first voltage level is less than the fourth voltage level.

14. A method comprising:
   receiving an input signal at a first input and at a second input to a rectifier circuit, the rectifier circuit comprising body diodes of a plurality of metal oxide semiconductor field effect transistor (MOSFET) devices;
   rectifying the input signal via the body diodes to produce a rectified output signal at a first output terminal and at a second output terminal, the first and second output terminals coupled to low power circuitry;

detecting a power event based on a power level associated with the input signal; and selectively activating at least one of the plurality of MOSFET devices to limit the rectified output signal to protect the low power circuitry when the power level exceeds a threshold power level.

15. The method of claim 14, wherein selectively activating the at least one of the plurality of MOSFET devices comprises coupling the first input to the second input by activating at least two of the plurality of MOSFET devices.

16. The method of claim 15, wherein the power level comprises a voltage level, and wherein coupling the first input to the second input comprises clamping the voltage level to a level that is less than or equal to a threshold voltage level.

17. The method of claim 15, wherein the power level comprises a current level, and wherein coupling the first input to the second input comprises shunting a current between the first input and the second input.

18. The method of claim 14, wherein selectively activating the at least one of the plurality of MOSFET devices comprises activating a first MOSFET device and a second MOSFET device of the plurality of MOSFET devices having respective body diodes that are reverse biased.

19. The method of claim 14, wherein rectifying the input signal via the body diodes further comprises selectively activating at least one of the plurality of MOSFET devices to bypass one or more of the body diodes that is forward biased when the power level of the input signal is less than or equal to the threshold power level.

20. The method of claim 14, wherein the threshold power level comprises a breakdown voltage of a zener diode, and wherein the low power circuitry comprises one or more circuit devices having a power rating that is greater than or equal to the threshold power level.

21. A circuit device comprising:
a diode bridge comprising a plurality of diodes, a first diode bypass element associated with a first diode of the plurality of diodes, and a second diode bypass element associated with a second diode of the plurality of diodes, the diode bridge including a first input terminal, a second input terminal, a first output terminal, and a second output terminal; and a logic circuit adapted to determine a first electrical parameter associated with the diode bridge and a second electrical parameter associated with the first and second input terminals, the logic circuit adapted to selectively activate the first diode bypass element in response to determining the first electrical parameter and to selectively activate the second diode bypass element in response to determining the second electrical parameter; and wherein the logic circuit selectively activates at least one of the first and second diode bypass elements to limit a rectified output signal provided to the first and second output terminals.

22. The circuit device of claim 21, wherein the first parameter comprises a first voltage level of a first cathode terminal associated with the first diode.

23. The circuit device of claim 22, wherein the logic circuit is adapted to activate the first diode bypass element when the first voltage level is greater than a negative voltage level at the second output terminal.

24. The circuit device of claim 21, wherein the logic circuit is adapted to activate the second diode bypass element when the second power level is greater than a threshold power level.

25. The circuit device of claim 24, wherein the second power level comprises a current, and wherein the second diode bypass element shunts the current between the first and second input terminals.

26. The circuit device of claim 21, wherein the second parameter comprises a second power level of the first input terminal and the second input terminal.

* * * * *